(12) United States Patent
Higgins, Jr.

(10) Patent No.: US 7,283,579 B2
(45) Date of Patent: Oct. 16, 2007

(54) DIVERSITY SYNCHRONOUS CONNECTION-ORIENTED AUDIO COMMUNICATION MODES

(75) Inventor: Robert J. Higgins, Jr., Plantation, FL (US)

(73) Assignee: Motorola, Inc., Schaumburg, IL (US)

( * ) Notice: Subject to any disclaimer, the term of this patent is extended or adjusted under 35 U.S.C. 154(b) by 824 days.

(21) Appl. No.: 10/465,141

(22) Filed: Jun. 19, 2003

(65) Prior Publication Data
US 2004/0258135 A1     Dec. 23, 2004

(51) Int. Cl.
*H04B 1/00* (2006.01)
(52) U.S. Cl. ...................................... 375/133
(58) Field of Classification Search ................ 375/133, 375/132, 130, 377, 259, 295; 455/426.1, 455/422.1, 403, 39; 381/150
See application file for complete search history.

(56) References Cited

U.S. PATENT DOCUMENTS 7,065,482 B2 *   6/2006   Shorey et al. .............. 709/224
2002/0062468 A1 *   5/2002   Nagase et al. .............. 714/755

OTHER PUBLICATIONS

Specification of the Bluetooth System v1.0B Dec. 1, 1999.*
Bluetooth specification v. 1.1.*

* cited by examiner

*Primary Examiner*—Pankaj Kumar
(74) *Attorney, Agent, or Firm*—Barbara R. Doutre

(57) ABSTRACT

The diversity SCO digital audio technique (300) provides packet protection through statistical diversity by adding new audio modes (202, 204) that operate within a Bluetooth framework (200). Increased packet protection improves audio intelligibility and data transmission. The combination of a blind or signaled transmission of a redundant packet (202 or 204) in combination with a randomly faded frequency hop for each packet provide for enhanced reliability and link quality.

10 Claims, 3 Drawing Sheets

DIVERSITY SYNCHRONOUS CONNECTION-ORIENTED AUDIO COMMUNICATION MODES

TECHNICAL FIELD

This invention relates in general to digital communication systems and more particularly to short-range wireless audio communication systems.

BACKGROUND

Bluetooth® is a low-power, short-range wireless networking standard designed for local area voice and data communication systems. The devices operating in these systems typically form an ad hoc wireless network when within communication range of one another. One communication device assumes the role of master and temporarily manages and synchronizes the other communication devices as slaves within the ad hoc wireless network. Portable battery operated devices, such as portable radios, are well suited for Bluetooth applications.

There is a growing interest, particularly in the public safety arena, in wireless Personal Area Networking (PAN) accessories to simplify communications, enhance safety, and increase effectiveness. Bluetooth is a PAN system designed for both digital toll quality voice and data traffic with a maximum channel data capacity of about 700 kb/s. Bluetooth data is coded in packets so that errors are detected and packets are retransmitted until correctly received. Short of a permanent loss of the communications link, the correct data will eventually be delivered. In the face of interference, data throughput will be degraded, but the correct data will eventually get through. Thus, Bluetooth is regarded as having "reliable data transfer" capability. Unfortunately, Bluetooth is not considered to have "reliable audio transfer" capability. Missed packets are considered better to be lost (as a noise or a pop) rather than delayed because delays would pose an equal or worse audio defect. Instead, Bluetooth audio was designed with variable bit error correction coding to protect the audio bits.

As the Bluetooth framework becomes incorporated into portable radio and mobile environments, there are concerns that the Bluetooth audio modes may not be robust enough to provide acceptable audio quality. Additionally, the Bluetooth system includes encrypted modes that provide a more secure audio link. While not generally in use today, there are plans for use of the encrypted modes in future mobile environments. These encrypted modes are likely to cause even further audio degradation.

Accordingly, it would be desirable to have a means of enhancing audio intelligibility within the Bluetooth standard. Such enhancements would improve the reliability, sensitivity, and quality of the audio links of portable communication devices operating within the Bluetooth standard.

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements, and in which:

DETAILED DESCRIPTION OF THE PREFERRED EMBODIMENT

Figure 1:
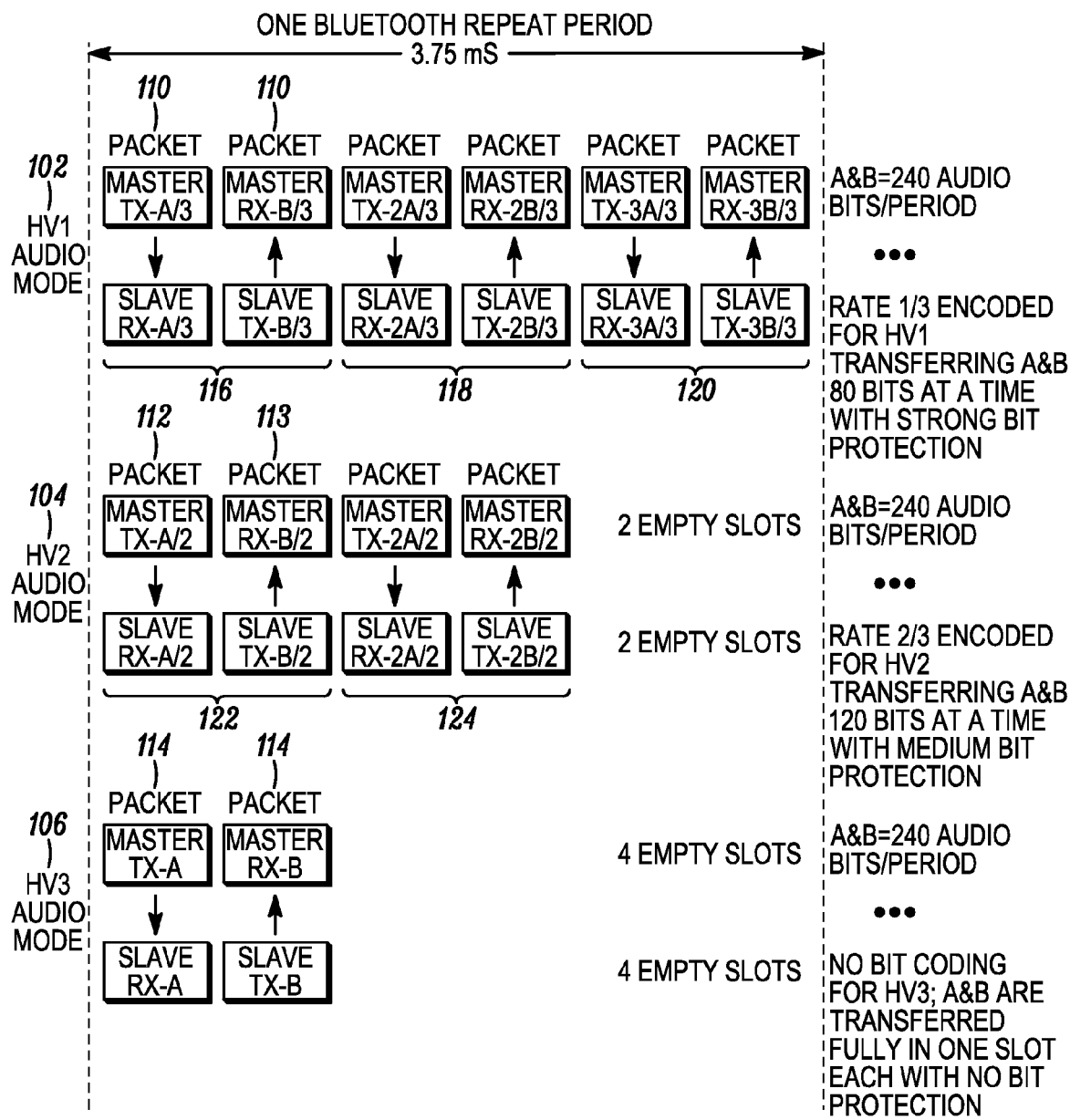
FIG. 1 is a prior art Bluetooth audio packet sequence options diagram.

While the specification concludes with claims defining the features of the invention that are regarded as novel, it is believed that the invention will be better understood from a consideration of the following description in conjunction with the drawing figures, in which like reference numerals are carried forward.

To facilitate the understanding of the invention to be described herein, a brief explanation of the operation of Bluetooth is provided over the next few paragraphs. Bluetooth is fundamentally organized as a time division duplex system with an uplink packet followed by a downlink packet. Three standard Synchronous Connection-Oriented (SCO) audio communication modes are described in Bluetooth standard: HV1, HV2, and HV3. The HV1 mode represents the most error-protected coding format, and the HV3 mode represents the least error-protected coding format. Unfortunately, the coding protects only the audio data bits within a packet but does nothing to prevent, improve, or correct for the dropping of an entire packet due to noise, poor signal level, or interference.

Experimental Bluetooth systems have shown that bit errors are inaudible and audio defects come from whole packet loss. Packet errors (packets which are entirely lost) occur when the integrity of the link wanes. Thus, it is the Packet Error Rate (PER) sensitivity that determines the quality of the audio link. Interference and fading are the main causes of packet errors, and the Bluetooth specification does not provide protection for lost audio packets. In general, and for the purposes of this application, a PER of 0.1 percent will sound nearly perfect with only a slight defect about once per second. A PER of 1 percent will sound crackly, but distinct and perfectly intelligible. A PER of 10 percent is intelligible, but disturbingly noisy, and a PER of 30 percent is essentially unintelligible.

Referring now to FIG. 1, there is shown the standard Bluetooth audio packet sequence options. Packet sequence options 100 include audio modes: HV1, HV2, and HV3, indicated respectively by designators 102, 104, and 106 over a single Bluetooth Frame (repeat period) of 3.75 ms. Each of these audio modes 102, 104, 106 sends packetized audio information (uplink packet A and downlink packet B) over a frequency hopping multiplexed link. Each packet transaction is on a different pseudo-random hop frequency (one of 80 in most of the world). In each of the audio modes 102, 104, 106, the frames A and B contain what is referred to as payload data. In Bluetooth HV1, HV2, and HV3 modes, total frame payload data comprises 240 audio bits per period in each of the uplink and downlink. In the coding of the HV1 mode there are only 80 real bits of audio being transferred at a rate of ⅓ FEC (Forward Error Correction) encoded in each packet. Thus, frame audio data A and B (110) are transferred 80 bits per packet as shown by designators 116, 118 and 120. With the HV2 mode, there are 120 real bits of audio data encoded at a rate of ⅔ FEC in each packet. Thus, frame audio data A and B (112) are transferred 120 bits per packet as indicated by designators 122, 124 leaving two empty packet time slots with no transmission. In the HV3 mode, each packet contains 240 bits of audio data with no error correction or detection. Thus, frame audio data A and B (114) are transferred fully in two packets with no error correction, leaving four empty packet time slots.

The transmission of the audio data in the HV1, HV2, HV3 audio modes (102, 104, and 106) is not guaranteed to be reliable. Since the audio consists of 64 k bits of data per second (in each of uplink and downlink), then 800 packets of HV1 data, 400 packets of HV2 data, or 266.666 packets of HV3 data are sent each second. The HV3 mode 106 was intended to be the most power efficient, while the HV1 mode was intended to be highest quality.

In actuality, the HV1 mode achieves only a slight improvement in performance in audio quality as compared to the HV3 mode. Two propagation factors are largely responsible for the poor behavior: firstly, the bit error rate (BER) versus the signal-to-noise (S/N) curve in the propagation region where errors are likely to occur in a packet is steep. Secondly, the propagation in and around a person is subject to substantial multi-path fading. For example, a change of only 3 dB in S/N can cause the audio to go from sounding quite good to sounding poor. Even worse, a 3-6 dB additional attenuation can cause a total loss of audio.

In the case of the first propagation factor, the audio is considered acceptable when the S/N ratio is such that the BER is in the $10^{-3}$ range. A 3 dB increase in path loss can cause these BER to go from $10^{-3}$ to $10^{-2}$. With the present low-end radio architectures being used for single-chip Bluetooth solutions, whole packet failures typically begin at $10^{-2}$ BER from loss of the packet header thereby causing loss of the entire audio data payload. Thus, the HV1 and HV2 modes really only have an opportunity to improve the audio in the narrow range of S/N from where the HV3 audio sounds good ($10^{-3}$ BER) and where packet errors commence at $10^{-2}$ BER (the coding in the headers of HV1 and HV2 is exactly the same as HV3).

In the case of the HV3 mode, there is a 3 dB gap from where the audio is considered acceptable to where packet errors commence. In the case of the HV2 mode, there is a theoretical advantage of approximately 3 dB over HV3 from bandwidth considerations. In the case of HV1, the theoretical advantage over HV3 is approximately 4.8 dB. However, in either case (HV2 or HV1), no improvement is realized once packet header errors commence. In each case, the packet errors occur at the same S/N. Hence, HV2 and HV1 ultimately have about the same performance and are, at best, about 3 dB better in sensitivity than HV3 for equal sound quality.

PAN applications rely heavily on radio wave propagation in and around the human body. On-body propagation at 2.4 GHz is characterized by strong radio wave shadowing. Hence, for body-to-body applications (such as a headset to a belt-worn two-way radio, or a headset to a cellular phone) the direct signal may be strongly attenuated due to shadowing; and reflected multi-path signals that may arrive via a longer path can be of commensurate amplitude. This shadowing causes the net signal arriving at a single antenna feed to be strongly faded with Raleigh-like statistics. Measured statistics suggest that the S/N will decline 10 dB from fading for 10 percent of the packets. If the link were operating 10 dB above the $10^{-2}$ sensitivity point (about 7 dB above the $10^{-3}$ BER sensitivity), the fading would result in about 10 percent packet loss which would provide abysmal audio performance in any of the audio SCO modes (HV1, HV2, HV3).

It is well known that in the faded circumstances described above, diversity can improve system performance more effectively than simply raising the transmitted power.

Another factor strongly influencing Bluetooth audio quality is interference from other radio sources in the same band or in the spurious reception bands of the inexpensive receivers used for Bluetooth communications. Interference may come from microwave ovens, cordless telephones, wireless local area networks, and many other devices today because Bluetooth normally operates in spectrum allocated for unlicensed ISM (Industrial, Scientific, Medical) use. Because the PAN devices operate around the human body with strong wave shadowing, the received signal to noise ratio (S/N) will be fairly low. In such cases, interfering sources with direct line of sight propagation to the receiving unit may present much higher interfering signal level than the desired transmitting Bluetooth source. Since Bluetooth is a frequency hopping system with a new choice of frequency for each packet transmitted, packet loss will not occur continuously, but will occur when the Bluetooth system hops to a frequency near the frequency of the interferer. When the signal level of the interferer is somewhat greater than that of the desired Bluetooth transmitter and the frequencies are within 400 kHz packet loss is likely to occur. If the interferer was a narrow bandwidth signal then packet loss would be 1/79 (because there are 79 channels allocated in the US) or 1.3 percent and intelligible but poor quality audio would be realized.

However, in the United States, the FCC (Federal Communications Commission) does not allow narrow bandwidth transmissions within the band where Bluetooth currently operates. Because of this, interfering sources are likely to cause packet loss over a greater fraction of the allocated hopping frequencies. Cordless phones can cause a loss of 10% of the packets at a range of 5 meters. Microwave ovens can cause a 10% packet loss from 10 meters. In these cases, audio quality will be very bad.

In accordance with the present invention, a new sequencing format and technique are provided to address the propagation and interference factors largely responsible for the poor audio performance in Bluetooth systems.

In a frequency hopping spread spectrum system (which Bluetooth is) the frequency chosen for each hop is pseudo-random. In the Bluetooth system, the hopping bandwidth is significant, typically 78 MHz at a center of 2.441 GHz. The Bluetooth system is designed such that each packet is transmitted at a new frequency, but during packet transmission, the frequency is constant. With such a large hopping bandwidth as Bluetooth provides, the faded path loss for one packet is substantially de-correlated from that of subsequent packets. Generally, fading de-correlation is a problem in radio design because the receiver must adapt to a new signal level rapidly in order to accommodate the hopped fading variations. However, the fading de-correlation from one packet to the next also provides opportunity for diversity.

In accordance with the present invention, there is provided a diversity audio packet sequence that provides Frequency Hop Diversity (FHD) for Bluetooth audio packets. The audio packet sequence of the present invention provides new audio modes within the Bluetooth framework. These new audio modes provide packet protection through statistical diversity.

In accordance with the present invention, new SCO modes, referred to herein as HD2 and HD1, are provided which take advantage of the packet fading de-correlation. In accordance with the present invention, the data structure for each packet of the HD2 mode is fundamentally the same as the HV3 packet; in other words having 240 raw audio payload bits. However, in accordance with the present invention, in the HD2 mode the packet is re-transmitted with identical data in a subsequent frequency hopped packet within the same frame. Upon reception, the signal quality for each packet can be evaluated by the correlation performance of the packet header or by the received signal strength indicator (RSSI) data available for that packet. The signal quality estimate is then used to combine the redundant data in the two packets to make an optimal decision for recovery of the transmitted audio data. In actuality, when one packet is faded to such an extent that the packet header and the packet data are lost; the second packet will be faded as a different random draw from the fading statistic and both the packet header and the packet data must fall into a fade to have a loss of a packet from the HD2 audio frame. The probability of both falling into a fade is far less than the single event, leading to improved quality and reliability in the delivered audio.

The frequency hop diversity performance advantage also extends to interference that may exist within the ISM band. Interferers are usually hopped or spread in such a manner as to occupy only a fraction of the ISM band over the course of any given Bluetooth packet. Just by random chance, an HVn (n being either 1, 2, or 3 to represent the 3 ordinary Bluetooth audio modes) mode will hop onto an interferer and will lose a packet when competing with the interferer. Using the frequency hop diversity scheme of the present invention, the probability of losing a packet to interference (or fading) is the probability of the HVn mode in the same condition, P{HVn}, raised to the power of the number of repeated (diversity) packets. If one of the Bluetooth channels is blocked by an interferer, then statistically 1 of every 79 ordinary Bluetooth packets will be lost corresponding to a packet error rate of 1.27 percent (which will sound noticeably corrupted). If a HD2 mode were used, the probability of a loss of packet would be $(1.27\%)^2$, or $1.61 \times 10^{-4}$, which would sound near perfect. For a more typical case of an interference source which is itself a spread spectrum signal, at a given range, a certain percentage of the ISM band will be blocked and when a packet is hopped within that band it is lost. For example, if a spread spectrum cordless phone caused an ordinary Bluetooth mode to have a PER of 10% (sounds bad), the corresponding HD2 PER would be 1% (sounds a little noisy, but far better than 10%).

Figure 2:
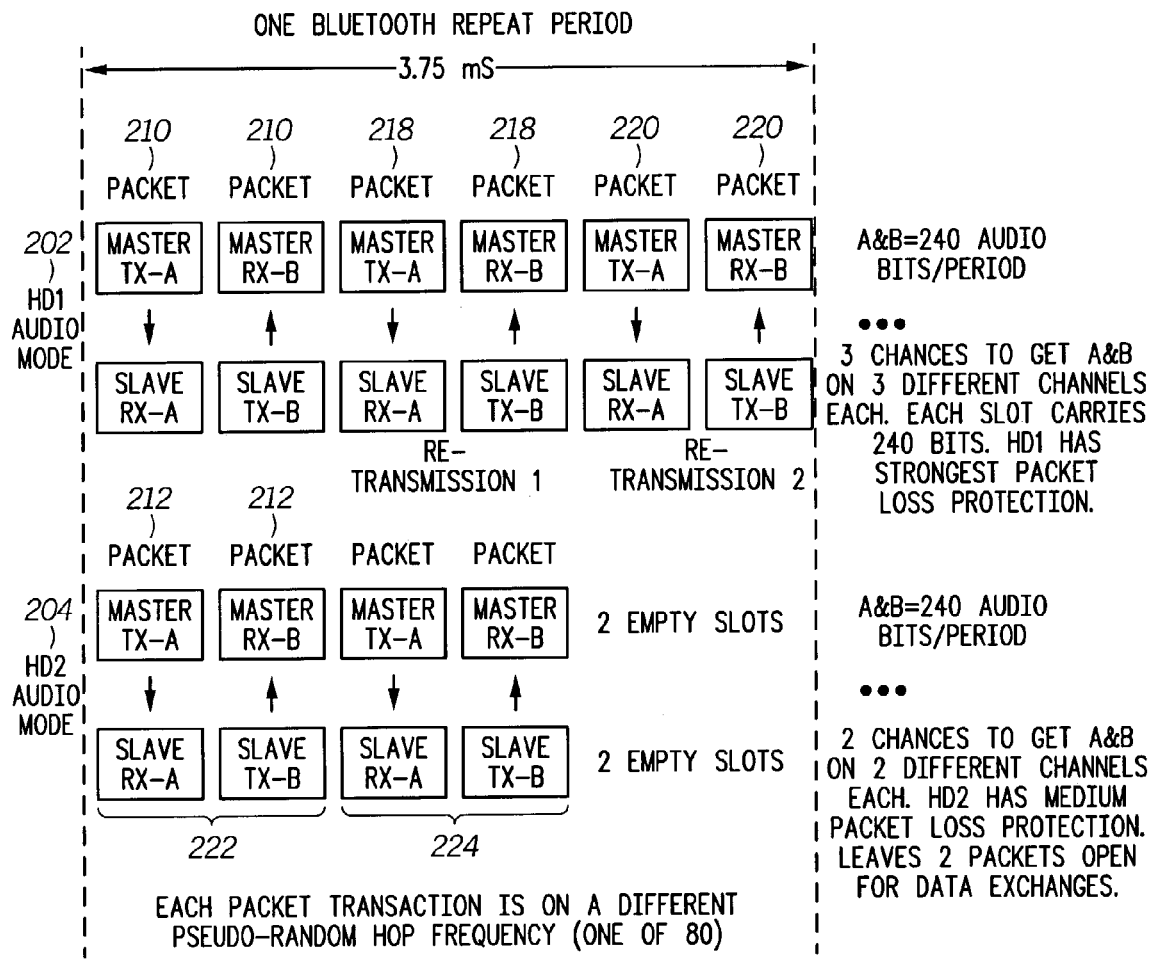
FIG. 2 is a set of diversity audio packet sequence options in accordance with the present invention.

In accordance with the present invention, the HD1 mode is similar to the HD2 mode, but the packet is retransmitted twice (three transmissions of the same data within the same Bluetooth frame). This provides additional criteria for optimal combination of the three payload data sets and even less opportunity for a fade or interference to cause an audio packet loss after combination. In this HD1 case of three transmissions of the audio payload data, the HD1 PER would be $P\{HVn\}^3$, and since $P\{HVn\}$ is less than 1, the FHD PER will be substantially lower than the PER in the normal mode. Additionally, in the HD1 mode the bits within the payload could be encoded with FEC and still take advantage of the FHD; this could be done to further balance the audio quality due to bit errors and packet errors. Referring now to FIG. 2, there is shown diversity Bluetooth audio packet sequence 200 in accordance with the present invention. Sequence 200 includes first and second audio modes: HDI 202 and HD2 204. Each of these audio modes 202, 204 sends packetized audio information over a frequency hopping multiplexed link. Each packet transaction is on a different pseudo-random hop frequency (one of 79 for Bluetooth). In each of the audio modes HD1 202, HD2 204, the packets contain payload data. As mentioned earlier in the Bluetooth system, payload data comprises 240 audio bits per frame with one Bluetooth frame (repeat period) being 3.75 ms.

In the coding of the HD1 mode 202 there are 240 real bits of audio payload being transferred in each direction via packets A and B 210. The next two slots 218, 220 comprise re-transmissions (re-transmission 1 and re-transmission 2). Thus, the HD1 mode provides three chances to get uplink audio payload packet A and downlink audio payload packet B on three different frequency hop channels each. Each slot carries 240 audio payload bits. Thus, HD1 has the strongest packet protection.

With the HD2 mode 204, there are 240 real bits of audio data in each packet. Thus, packets A and B 212 are transmitted twice as indicated by designators 222, 224 leaving two empty slots which can be used for data exchange. Thus, the HD2 mode provides two chances to get A and B packets on two different frequency hop channels each. HD2 thus provides medium packet loss protection.

As another example, microwave ovens operating at 2.4 GHz can be particularly problematic when operating in close range of an ordinary Bluetooth PAN causing a 30% packet loss (PER=0.30) from the typical 1 watt of oven radio wave leakage power. This level of PER causes the ordinary mode Bluetooth audio to become unintelligible. The HD1 mode will substantially improve the net PER to that of the ordinary mode cubed. Thus, the PER for $HD1=(0.3)^3=0.027$. This level of PER will result in reconstructed audio that is highly intelligible with some audible noise. The HD2 mode will square the PER from the ordinary Bluetooth modes. Thus, the PER $HD2=(0.3)^2=0.09$. This PER would result in reconstructed audio that would sound intelligible but noisy.

The frequency hop diversity SCO digital audio technique of the present invention provides packet protection through statistical diversity by adding new audio modes that operate within the Bluetooth framework. Increased packet protection improves audio intelligibility. The new modes provide an enhancement to the Bluetooth standard and improve the reliability, sensitivity, and quality of the audio links. The combination of a blind (retransmission always occurs) or signaled retransmission (based on instructions from a remote unit) of a redundant packet in combination with a frequency hop for each packet provide for enhanced reliability and link quality. Thus, improvements in faded and interfered environments can now be achieved.

Figure 3:
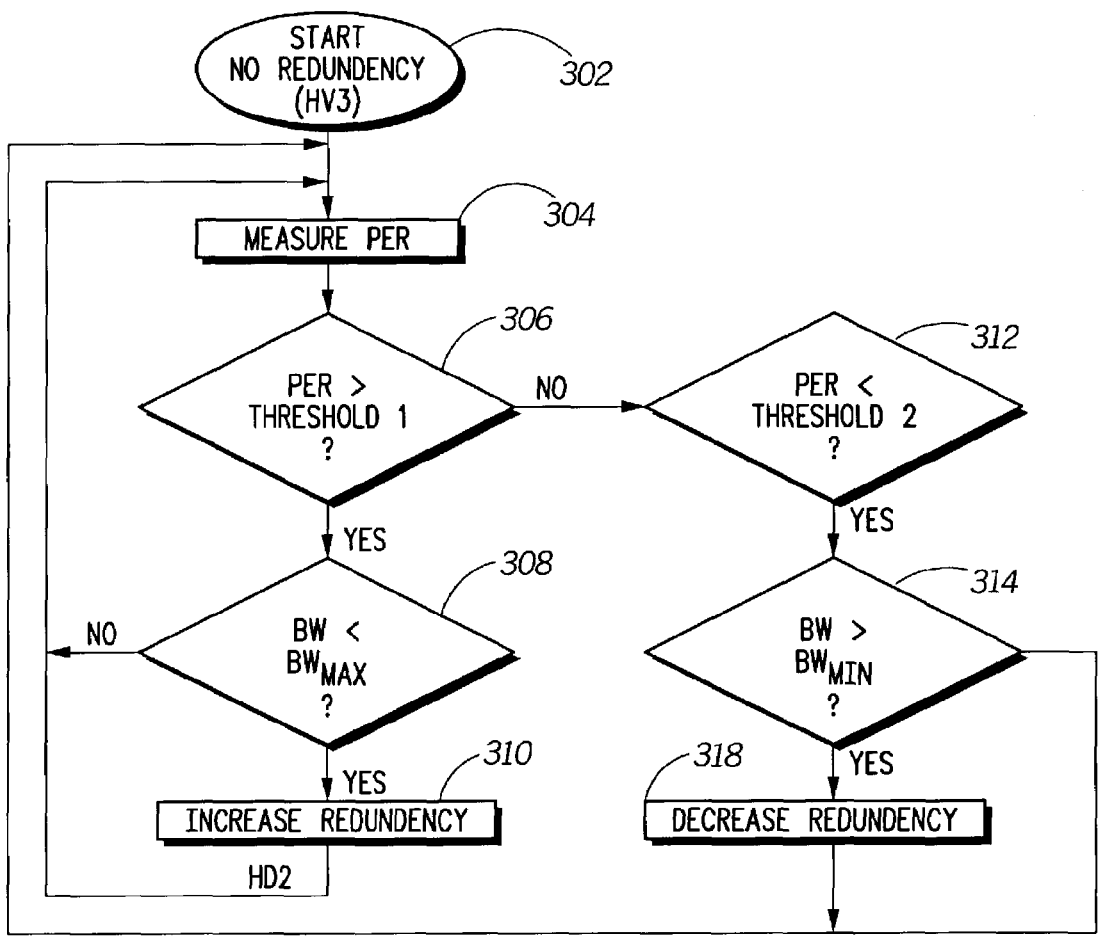
FIG. 3 is a flow chart of a diversity sequencing technique in accordance with the present invention.

Referring to FIG. 3 there is provided a flow chart of a frequency hop diversity control technique in accordance with the present invention. Technique 300 begins by establishing an ordinary Bluetooth audio SCO mode with no redundancy (e.g. HV3) at step 302. The Bluetooth master device which controls the Bluetooth piconet (the group of communicating devices under control by this Bluetooth master device) knows that there is room for only three uplink/downlink slot pairs within a standard Bluetooth frame. The master sets a bandwidth limit that may be allowed for audio communication based on the user's preference for audio or data priority. Depending on the user's previous input and the amount of information being transferred to another device within the piconet, the Bluetooth master may set the $BW_{max}$ parameter to either 1, 2, or 3 representing either 1, 2, or 3 available uplink/downlink time slots. Initially the occupied bandwidth, BW, is 1 because the HV3 mode uses up one uplink/downlink time slots. Packet error rate (PER) is measured at step 304 and compared to a first PER threshold at step 306. If the PER threshold is exceeded, the occupied data bandwidth, BW, is compared to $BW_{max}$ at step 308. If BW is less than $BW_{max}$, then the redundancy mode is increased (e.g. from HV3 to mode HD2) at step 310 and returned to step 304. If the BW is equal to $BW_{max}$, then instead, the control returns to step 304 without change to the redundancy.

If the PER at step 306 is found not to exceed Threshold 1, the PER is compared against a second, lower threshold (Threshold 2) at step 312. If the PER is found to be lower than Threshold 2, flow continues to step 314. If the occupied data bandwidth, BW, is greater than the minimum allowed bandwidth of 1 at step 314, then the redundancy is decreased, (e.g. from HD2 to HV3) and control is returned back to step 304. If at step 314, the BW is found to be at its minimum value of 1, then control is simply returned to step 304 without change to the operating mode.

The frequency hopping diversity scheme of the present invention provides the opportunity to save power within the framework of the system. Bluetooth is fundamentally organized as a duplex system with an uplink packet followed by a downlink packet. In the diversity modes, remote transmitter power savings can be achieved by signaling on the next packet whether the redundant transmission is needed. Similarly, power savings can be achieved in the receiver based solely upon its own knowledge. If the system receives a first packet with high confidence, there is no need to turn on the receiver during expected subsequent redundant packet transmissions. In Bluetooth systems, the receiver/transmitter are the primary sources of battery drain, the digital backend representing only a minor fraction of the total power drain.

Accordingly, there has been provided a means for enhancing packet protection within a Bluetooth framework. Increased packet protection is achieved through statistical diversity by adding new audio modes that operate within the Bluetooth framework. Increased packet protection improves audio reliability, sensitivity, and quality compared to the audio links available within the Bluetooth standard.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A frequency hopped spread spectrum system, comprising:
   a transmitter having first and second diversity synchronous connection-oriented (SCO) modes (HD1, HD2) having a plurality of packets, within a Bluetooth frame;
   each packet of the HD2 mode being structured substantially the same as a standard Bluetooth HV3 packet, each HD2 packet in the Bluetooth frame containing substantially the same payload data, the HD2 mode having a first packet transmission in a first frequency hopped time slot, and the HD2 mode having a second HD2 packet transmission in a subsequent frequency hopped time slot within the Bluetooth frame; and
   the HD1 mode being similar to the HD2 mode, the HD1 packet being transmitted three times within the Bluetooth frame thereby providing three frequency hopped transmissions of the same payload data within the Bluetooth frame in the HD1 mode.

2. The frequency hopped spread spectrum system of claim 1, wherein a signal quality estimate for each packet is evaluated at a receiver by utilizing one of:
   a header's correlation performance for each packet received by the receiver; and
   a received signal strength indicator (RSSI) data available from reception of each packet received by the receiver;
   wherein the signal quality estimate is used to make an optimal recovery of transmitted data from redundant HD1 or HD2 data received.

3. The frequency hopped spread spectrum system of claim 1, wherein probability of losing an audio payload in an HDn mode frame is probability of losing a packet in the HV3 mode, P {HV3 }, raised to the power of the number of repeated (diversity) HDn packets.

4. The frequency hopped spread spectrum system of claim 1, wherein audio payload bits within the HD1 mode are not identical but are encoded in a manner to otherwise optimize transmitted audio payload data by the receiver.

5. A method for reducing packet loss in a frequency hopping communications system, comprising:
   transmitting a sequence of synchronous connection-oriented (SCO) packets at a first redundancy rate by a transmitter;
   estimating packet error rate (PER) of the sequence by a receiver; and
   transmitting future SCO packets by the transmitter without acknowledgment at a second redundancy rate when the PER exceeds a predetermined threshold, wherein the redundancy rate within future frame transmissions is dependent on available data bandwidth.

6. A sequencing technique for a frequency hopping system, comprising:
   establishing a synchronous connection-oriented (SCO) packet transmission sequence without packet transmission redundancy between a transmitter and a receiver;
   determining probability of error free reception for the SCO packet transmission sequence without the packet transmission redundancy at the receiver;
   comparing the determined probability to a probability threshold and a maximum data bandwidth limitation;
   increasing packet transmission redundancy for future SCO packet transmissions by the transmitter if the probability threshold is exceeded by the determined probability and the maximum data bandwidth limitation is not exceeded by increasing the packet transmission redundancy;
otherwise:
   comparing the determined probability against a second probability threshold and a minimum data bandwidth limitation; and
   decreasing the packet transmission redundancy for the future SCO packet transmissions by the transmitter if the determined probability is below the second probability threshold and data bandwidth which result from the decrease in the packet transmission redundancy is greater than the minimum data bandwidth limitation.

7. A sequencing technique for a frequency hopping system, comprising:
   establishing a synchronous connection-oriented (SCO) packet transmission sequence without packet transmission redundancy between a transmitter and a receiver;
   estimating a packet error rate (PER) of the sequence by the receiver;
   determining data bandwidth (BW) of a packet within the SCO packet transmission sequence;
   comparing the estimated PER to predetermined PER thresholds and the BW to predetermined BW limitations;
   increasing the packet transmission redundancy of future SCO packets of the SCO packet transmission sequence when the PER and BW fall within the predetermined PER thresholds and the predetermined BW limitations; and decreasing the packet transmission redundancy of future SCO packets of the SCO packet transmission sequence when the PER and BW fall outside of the predetermined threshold and the predetermined BW limitations.

8. The sequencing technique of claim 7, wherein the frequency hopping system is a Bluetooth system having Bluetooth audio modes.

9. The sequencing technique of claim 7, wherein the step of increasing the packet transmission redundancy of the future SCO packets comprises the steps of providing blind re-transmissions of audio packet data.

10. The sequencing technique of claim 7, further comprising the step of changing the packet transmission redundancy based on signaled instructions from a receiver within the frequency hopping system.

* * * * *